(12) United States Patent
Hama et al.

(10) Patent No.: US 8,538,088 B2
(45) Date of Patent: Sep. 17, 2013

(54) CAPTURE DEVICE FOR BIOMETRICS AUTHENTICATION AND BIOMETRICS AUTHENTICATION DEVICE

(75) Inventors: Soichi Hama, Kawasaki (JP); Takahiro Aoki, Kawasaki (JP); Mitsuaki Fukuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 73 days.

(21) Appl. No.: 12/805,677

(22) Filed: Aug. 12, 2010

(65) Prior Publication Data
US 2010/0322484 A1 Dec. 23, 2010

Related U.S. Application Data

(63) Continuation of application No. PCT/JP2008/052554, filed on Feb. 15, 2008.

(51) Int. Cl.
*G06K 9/00* (2006.01)

(52) U.S. Cl.
USPC ........... 382/115; 382/116; 382/126; 382/218; 340/5.53; 340/5.83

(58) Field of Classification Search
USPC ............... 382/115, 116, 126, 218; 340/5.53, 340/5.83
See application file for complete search history.

(56) References Cited

U.S. PATENT DOCUMENTS

| 7,031,502 B1 | 4/2006 | Mil'shtein et al. |
| 7,580,552 B2 | 8/2009 | Yoshizu et al. |
| 2005/0286744 A1 * | 12/2005 | Yoshizu et al. ............... 382/115 |
| 2006/0080547 A1 | 4/2006 | Higashiura et al. |
| 2007/0003112 A1 | 1/2007 | Awatsu et al. |

FOREIGN PATENT DOCUMENTS

| JP | 2005-107629 | 4/2005 |
| JP | 2005-128936 | 5/2005 |
| JP | 2006-11988 | 1/2006 |
| JP | 2006-107399 | 4/2006 |
| JP | 2006-167333 | 6/2006 |
| JP | 2007-11769 | 1/2007 |
| JP | 3916647 | 2/2007 |

OTHER PUBLICATIONS

Saito et al: JP2006-167333-Eng, a English version of JP2006-167333, which was translated by machine.*
Saijo et al: JP2006-167333-Eng, a English version of JP2006-167333, Jun. 29, 2006, which was translated by machine.*
International Search Report for PCT/JP2008/052554, mailed May 13, 2008.
"Forget fingerprints with the PalmSecure", Jun. 2007, Retrieved from the internet: http://www.ubergizmo.com/2007/01/forget-fingerprints-with-the-palmsecure.
Extended European Search Report dated Jun. 1, 2012 issued in corresponding European Patent Application No. 08711384.1.

* cited by examiner

*Primary Examiner* — Ruiping Li
(74) *Attorney, Agent, or Firm* — Staas & Halsey LLP (57) ABSTRACT

A disclosed capture device for biometrics authentication using an image of a person's palm includes an image sensor capturing the person's palm and acquiring an image of the person's palm and a guide member supporting the person's palm when the person's palm is captured by the image sensor. Further, the guide member has a V-shaped-type groove in which a finger of the person's palm is to be inserted.

13 Claims, 11 Drawing Sheets

FIG.2A

CENTER OF ZOOM

FIG.2B

ZOOM →

FIG.10C CENTER LINE OF GUIDE GROOVE

FIG.10D CENTER LINES OF GUIDE GROOVES

CAPTURE DEVICE FOR BIOMETRICS AUTHENTICATION AND BIOMETRICS AUTHENTICATION DEVICE

CROSS-REFERENCE TO RELATED APPLICATIONS

This application is a U.S. continuation application filed under 35 USC 111(a) claiming benefit under 35 USC 120 and 365(c) of PCT application JP2008/052554, filed Feb. 15, 2008. The foregoing application is hereby incorporated herein by reference.

FIELD

The embodiment discussed herein is related to a capture device for biometrics authentication and a biometric authentication device.

BACKGROUND

Japanese Laid-Open Patent Application No. 2005-128936 discloses a finger authentication device including a guide part for setting a finger's position, a light source part for applying transmitted light to the finger, an imaging part for imaging the transmitted light, and an authenticating part for authenticating the image taken by the imaging part. The guide part includes an authenticated and a non-authenticated finger placement guide part for setting fingers that are note to be authenticated.

Japanese Patent No. 3916647 discloses a biometric device including a transparent plate formed of glass or plastic for placing an object which is a finger of a person to be authenticated downwards in the figure, an illumination device for fingerprint photographing, an illumination device for vein photographing, and imaging apparatus provided with a zoom optical system. The imaging apparatus is provided with an object field depth expansion system with an optical wave surface modulation element and an image processing part. In authentication, image data generated in an image processor of the object imaged by an imaging device and present reference authentication data are compared, and the size of an object image fetched by the imaging device is adjusted by driving the zoom optical system.

Japanese Laid-Open Patent Application No. 2006-11988 discloses an image capturing apparatus for palm authentication which facilitates correct placement of a user's hand. In order to correctly guide the palm of a user into an image capturing region, on one side of a non-contact sensor unit for image capturing the palm, a front face guide is provided for supporting a wrist having a hand to be captured by the non-contact sensor unit. The front face guide enables guiding of the palm naturally to an image capturing region of the sensor unit. Because of the front face guide supports the wrist, the palm can correctly be positioned within the image capturing region of the sensor unit. A rear guide may also be provided, on the other side of the non-contact sensor unit, for supporting the fingers of the hand.

SUMMARY

According to an aspect of the present invention, a capture device for biometrics authentication using an image of a person's palm, the capture device includes an image sensor capturing the person's palm and acquiring an image of the person's palm and a guide member supporting the person's palm when the image of the person's palm is captured by the image sensor. Further, the guide member has a V-shaped-type groove in which a finger of the person's palm is to be inserted.

The object and advantages of the invention will be realized and attained by means of the elements and combinations particularly pointed out in the claims.

It is to be understood that both the foregoing general description and the following detailed description are exemplary and explanatory and are not restrictive of the invention as claimed.

DESCRIPTION OF EMBODIMENT

For example, when an image of a person's body part such as a finger(s) or a palm of the person is captured for biometrics authentication, it is desirable that the image of the finger(s) or the palm is captured in a manner such that the finger(s) or the palm is nearly matches an angle of view of a camera used as an image sensor. By positioning in this way, the loss in camera resolution may be reduced and a favorable image may be captured, thereby enabling obtaining more accurate authentication result.

The above mechanism is described below with reference to FIG. 1.

Figure 1A:
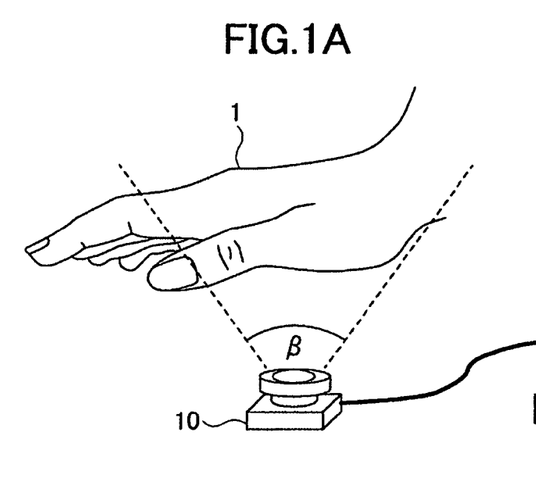
FIG. 1 is drawings (1) illustrating a conventional drawback.

As illustrated in FIG. 1A, generally, a camera 10 used as an image sensor has the angle of view "β" constituting a capturing range "R".

As described above, as illustrated in FIG. 1C, it is desirable that, for example, an image of a person's palm 1 is captured when the person's palm just fits the capturing range "R" of the camera 10.

Figure 1B:
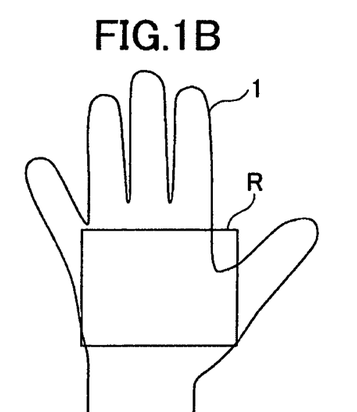

On the other hand, when the person's palm 1 to be authenticated is relatively large or when a distance between the camera 10 and the person's palm 1 to be authenticated is too short, as illustrated in FIG. 1B, the person's palm 1 to be authenticated may not be located within the capturing range "R" of the camera 10 and a part of the person's palm 1 is protruded outside the capturing range "R". In such a case, since the part of the person's palm 1 to be authenticated is protruded outside the capturing range "R", the lack of the of the image of the person's palm 1 part to be necessarily captured may prevent an accurate authentication result from being obtained.

Figure 1C:
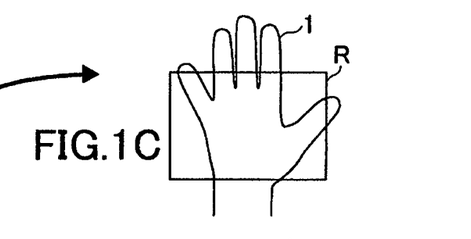
Figure 1D:
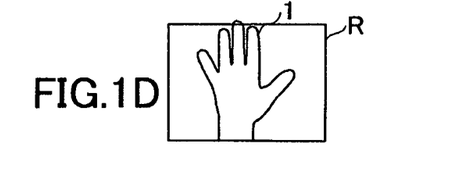

In contrast, when the person's palm 1 to be authenticated is relatively small or when a distance between the camera 10 and the person's palm 1 to be authenticated is too long, as illustrated in FIG. 1D, the entire person's palm 1 to be authenticated can be located within the capturing range "R" of the camera 10. However, as the body part of the person to be authenticated, besides the image of the person's palm 1 to be essentially captured, other body parts (e.g., fingers and a wrist) of the person and background may be included with a relatively large ratio within the capturing range "R". In such a case, the resolution of the image of the person's palm 1 to be essentially captured may be reduced; and as a result, an accurate authentication result may not be obtained.

However, in order to properly capture the image of the person's palm 1 to be authenticated in a manner such that the person's palm 1 to be authenticated just fits the angle of view "β" of the camera 10 as illustrated in FIG. 1C, it may be preferable to adjust the position of the person's palm 1 to be authenticated or the position of the camera 10 while monitoring an image using a monitor or the like, which is, however, inconvenient.

To overcome the inconvenience, there have been an proposal for providing a guide in advance so that a person's palm to be authenticated can be placed in its proper position (see for example, Japanese Laid-open Patent Publication Nos. 2005-128936 and 2006-11988).

However, a size of a person's body part such a palm varies among different individuals. Because of this feature, when a guide manufactured for a person having a smaller palm is used for a person having a larger palm, a part of the person's palm to be authenticated may be outside the capturing range "R". On the other hand, when a guide manufactured for a person having a larger palm is used for a person having a smaller palm, the image of the person's palm to be authenticated may be captured in smaller size in the capturing range "R" or the position of the person's palm is likely to be undesirably shifted. When a part of the person's palm to be authenticated is outside the capturing range "R", as described above, necessary information may be absent. On the other hand, when the image of the person's palm is captured in smaller size, if the captured image is digitally enlarged, as described above, the resolution of the captured image may be reduced and as a result, the authentication accuracy may be degraded.

As another prior-art technique addressing the differences among individuals, Japanese Patent No. 3916647 discloses a technique of adjusting a zoom of the image forming system based on a comparison result between the size of the captured image and a reference so that the person's palm can be captured in a proper size. However, the cost and the size of the optical system having such a zooming mechanism is generally more expensive and larger, respectively, than an ordinary lens system. Further, the zoom is performed using the optical axis as the center; therefore, when the capturing position is shifted from the optical axis, the capturing subject may be outside the capturing range when the zoom is performed.

This inconvenience is described with FIG. 2.

Figures 2A, 2B:
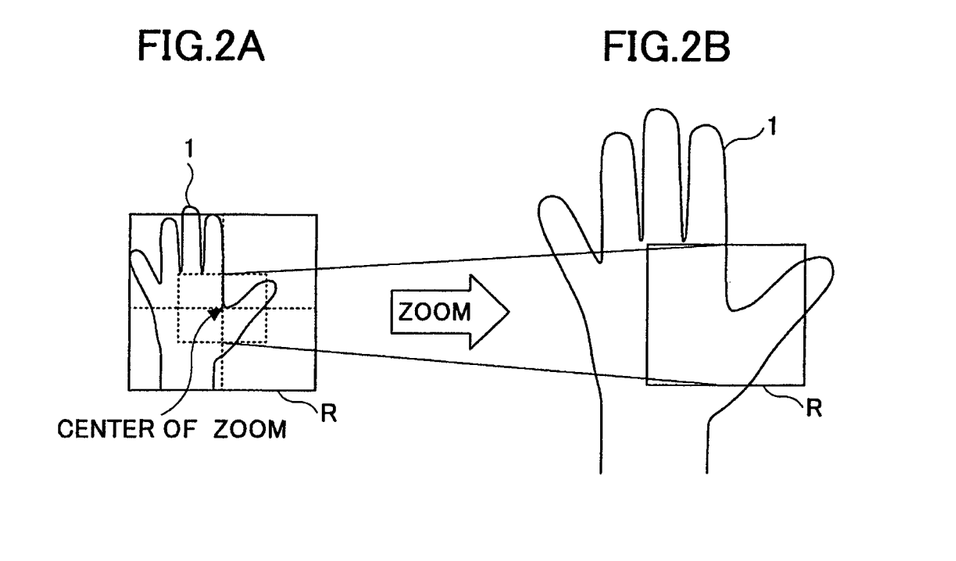
FIG. 2 is drawings (2) illustrating a conventional drawback.

For example, as illustrated in FIG. 2A, in a case where relatively larger range including the image of the person's palm 1 to be authenticated is captured, when the center of the person's palm 1 is shifted from the center of the capturing range "R" at a capturing timing and the zoom is performed as described above, in the zooming result, as illustrated in FIG. 2B, the entire person's palm 1 which should be obtained may not be obtained but only the right half of the person's palm 1 and the thumb are included within the zoomed capturing range "R". In such a case, highly-accurate authentication result may not be obtained.

The present invention is made in light of above circumstances, and may provide a capture device for biometrics authentication capable of capturing a good image regardless of the size of a person's body part to be authenticated when the person's body part to be authenticated is captured and a biometrics authentication device having the capture device.

To overcome the above inconvenience, according to an embodiment of the present invention, there is provided a guide for supporting a person's body part when the image of the person's body part is captured using an image sensor. By using the guide to capture the image of the person's body part using an image sensor, when the person's body part is supported by the guide, the distance between the person's body part and the image sensor is automatically adjusted depending on the size of the person's body part.

As an example of the configuration that the distance between the person's body part and the image sensor is automatically adjusted in accordance with the size of the person's body part when the guide supports the person's body part upon capturing the image of the person's body part, there may be one configuration in which, in a case where the person's body part is the person's palm, there is provided a guide having V-shaped grooves in which fingers of the person are to be inserted.

It is thought that the size of a person's palm is proportional to the thickness of the person's fingers. Namely, it is thought that the thickness of the finger of a person having a larger palm is accordingly thicker. On the contrary, it is also thought that the thickness of the finger of a person having a smaller palm is accordingly thinner.

By providing the V-shaped groove so that the fingers are inserted in the V-shaped grooves as described above and further providing an image sensor disposed near the bottoms of the grooves, as described below with reference to FIG. 3 or the like, when a person having a large palm and having accordingly thick fingers inserts the fingers in the V-shaped grooves, the fingers may not be deeply inserted towards the bottoms of the grooves and remains near the edge of the grooves. As a result, the distances between the fingers and the bottoms of the grooves are long; therefore, the distances between the fingers and the image sensor disposed near the bottoms of the grooves are accordingly long. As a result, the image of the person's palm to be authenticated is captured in relatively small size within the capturing range of the image sensor; therefore, it becomes possible that the person's palm to be authenticated just fits the capturing range of the image sensor. Therefore, the subject to be authenticated may be fully and adequately captured; the loss in resolution may be minimized; and a highly-accurate authentication result is expected to be obtained.

On the other hand, when a person having a small palm and having accordingly thin fingers inserts the fingers in the V-shaped grooves, the fingers are deeply inserted towards the bottoms of the grooves. As a result, the distances between the fingers and the bottoms of the grooves are short; therefore, the distances between the fingers and the image sensor disposed near the bottoms of the grooves are accordingly short. As a result, the image of the person's palm to be authenticated is captured in relatively large size within the capturing range of the image sensor; therefore, it becomes possible to minimize the ratio of the unnecessary parts such as unnecessary finger (thumb), wrist, background and the like included in the capturing range of the image sensor. Therefore, the image of the subject to be authenticated may be fully and adequately captured; the loss in resolution may be minimized; and a highly-accurate authentication result is expected to be obtained.

As described above, according to an embodiment of the present invention, simply by supporting a person's body part (a palm in the above case) to be authenticated by the guide, when the person's body part to be authenticated is large, the distance between the person's body part and the image sensor is accordingly long, and on the contrary, when the person's body part to be authenticated is small, the distance between the person's body part and the image sensor is accordingly short. Because of this feature, the distance between the person's body part and the image sensor is automatically adjusted based on the size of the person's body part.

Further, in the above example, a case is described where the shape of the grooves is V-shaped. However, the shape of the grooves is not limited to the V-shaped. Similar to the V-shaped groove, any other shape of groove having a wide width between the edges of the groove and the width is decreased as approaching the bottom section may be also used. Obviously, by using the grooves having such a shape, a similar effect to that produced by using the V-shaped grooves can be obtained.

As described above, according to an embodiment of the present invention, it may become possible to provide a capture device for biometrics authentication and the biometric authentication device in which the distance between the image sensor and the person's body part to be authenticated is automatically adjusted when the image of the person's body part to be authenticated is captured and therefore, the image of the subject to be authenticated can be fully and adequately captured; the loss in resolution can be minimized; and a highly-accurate authentication result is expected to be obtained.

A capture device for biometrics authentication according to an embodiment of the present invention is used in a biometrics authentication device capable of capturing an image of a person's body part and performing authentication based on the captured image. Further, the capture device for biometrics authentication according to an embodiment of the present invention includes an image sensor unit for capturing an image of a body part and a guide for supporting the body part, in a manner such that a size of the guide supporting the body part similarly varies in proportion to a distance from the image sensor unit.

More specifically, the capture device for biometrics authentication according to an embodiment of the present invention captures an image of a person's hand as a subject to be authenticated and includes a guide determining the distance between the person's hand and the image sensor unit in accordance with the thickness of the finger(s) of the hand and the distance between the fingers (a first embodiment described below with reference to FIG. 3 and the like).

Further, the capture device for biometrics authentication according to another embodiment of the present invention captures an image of a person's finger(s) to be authenticated and includes a guide determining the distance between the finger(s) and the image sensor unit in accordance with the thickness of the finger(s) (a second embodiment described below with reference to FIG. 8 and the like).

Further, the capture device for biometrics authentication according to still another embodiment of the present invention captures an image of a person's wrist to be authenticated and includes a guide determining the distance between the wrist and the image sensor unit depending on the thickness of the wrist (a third embodiment described below with reference to FIG. 9 and the like).

In the following, the principles of the embodiments of the present invention are described.

The size of a person's body part greatly varies among different individuals. The shape of a person's body part, however, does not greatly vary among different individuals. For example, the size of an adult's hand may be twice as large as that of a child's hand. The shape of the adult's hand, however, is similar to that of the child's hand. Based on this feature, according to an embodiment of the present invention, by using a guide designed so that the size of the guide similarly varies in proportion to the distance from a camera used as the image sensor, there is provided a capture device for biometrics authentication that can be performed regardless of the difference in size of a person's body part such as a person's hand.

In the following, a configuration of a capture device for biometrics authentication according to the first embodiment of the present invention is described with reference to the accompanied drawings.

Figure 3A:
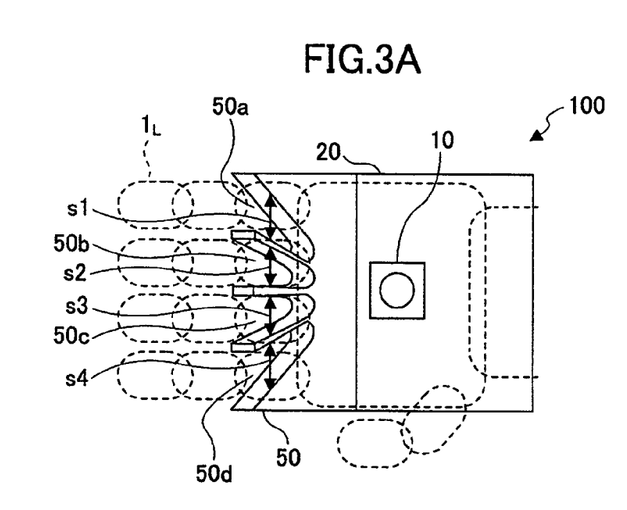
FIG. 3A is a top view illustrating a configuration of a capture device for biometrics authentication according to a first embodiment of the present invention.
Figure 3B:
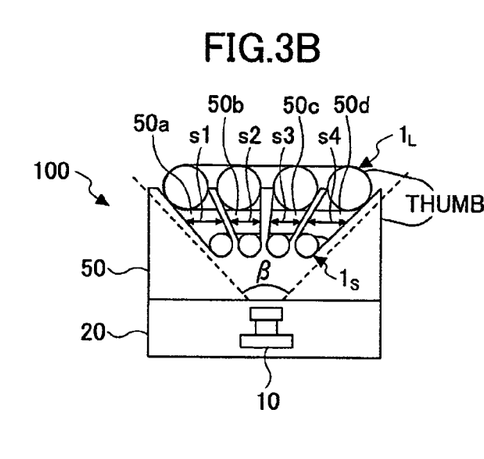
FIG. 3B is a front view illustrating the configuration of the capture device for biometrics authentication according to the first embodiment of the present invention.
Figure 3C:
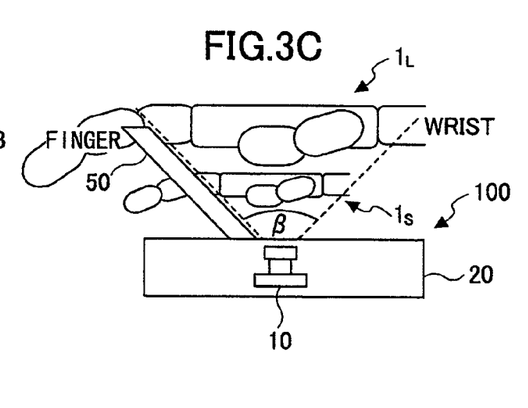
FIG. 3C is a side view illustrating the configuration of the capture device for biometrics authentication according to the first embodiment of, the present invention.

FIGS. 3A through 3C are drawings illustrating a configuration of a capture device for biometrics authentication 100 according to the first embodiment of the present invention.

In the first embodiment of the present invention, the capture device for biometrics authentication 100 acquires an image of a person's palm as a person's body part to be authenticated.

As illustrated in the figures, in the first embodiment of the present invention, in summary, the capture device for biometrics authentication 100 includes a guide 50 supporting a person's palm $1_L$ or $1_S$ to be authenticated and an image sensor unit 20 having an image sensor (i.e., a camera) 10 for capturing an image of the person's palm $1_L$ or $1_S$.

The guide 50 is a substantially rectangular plate-shaped member in which guide grooves 50a, 50b, 50c, and 50d are formed, so that four fingers excluding the thumb among the fingers of a person's hand $1_L$ or $1_S$ to be authenticated are inserted in the guide grooves 50a, 50b, 50c, and 50d.

The shape of those guide grooves 50a, 50b, 50c, and 50d is V-shaped-type so that the widths s1 through s4 as illustrated in FIGS. 3A and 3B are gradually decreased as approaching from the edge portion to the bottom section of the guide grooves.

Herein, for explanatory purposes, the person's hand $1_L$ or $1_S$ is schematically described throughout the figures. Further, the person's hand $1_L$ represents the supposed maximum size of a person's hand determined in design process. On the other hand, the person's hand $1_S$ represents the supposed minimum size of a person's hand determined in the design process.

As described above, the guide 50 has the guide grooves 50a, 50b, 50c, and 50d, and those guide grooves 50a, 50b, 50c, and 50d are designed so that the distance between the image sensor 10 of the image sensor unit 20 and the person's hand $1_L$ or $1_S$ to be authenticated is determined in accordance with the thickness of the fingers of the person's palm. Further, the guide 50 is mounted on the image sensor unit 20 in a manner such that the guide 50 extends along a boundary line (i.e., the dashed line in, for example, FIG. 3C of the angle of view "β" of the image sensor 10 of the image sensor unit 20.

Next, a method of designing the guide 50 is described.

In order to fit the person's palm to the angle of view "β" (constituting a capturing range "R") of the image sensor 10 to obtain a proper capture image, it may be preferable to adjust the distance between the person's hand to be authenticated and the image sensor 10 in accordance with the size of the person's hand.

Figure 4:
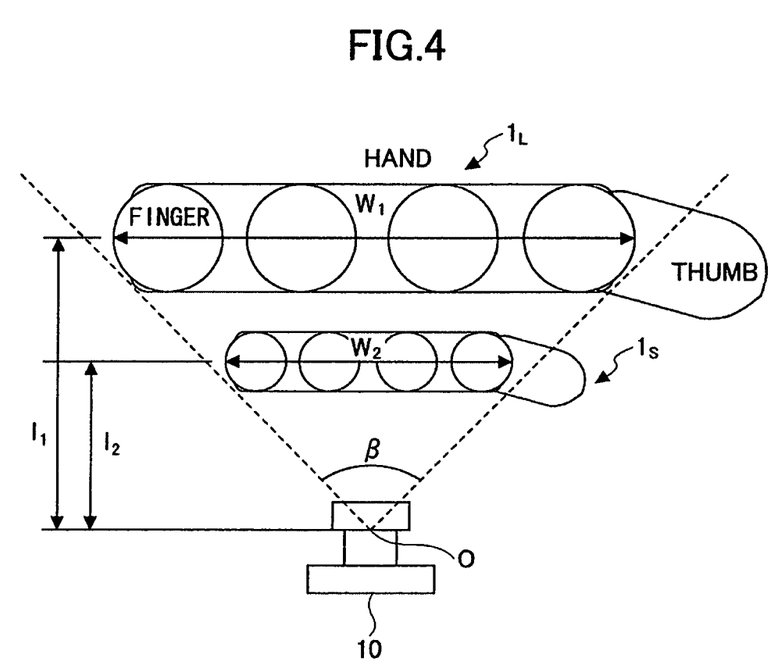
FIG. 4 is a drawing (1) illustrating a method of designing a guide of the capture device for biometrics authentication of FIG. 3.

As illustrated in FIG. 4, the widths "$W_1$" and "$W_2$" of the capturing range "R" constituted by the angle of view "β" of the image sensor 10 are in proportion to the distances "$1_1$" and "$1_2$" from the optical center "O" of the image sensor 10. Because of this feature, the position of the palm to be authenticated is adjusted so such that the distance from the optical center "O" of the image sensor 10 is increased in proportion to the size of the palm to be authenticated.

In this embodiment, the thickness of the finger(s) is used as an index of the size of the palm.

Figure 5A:
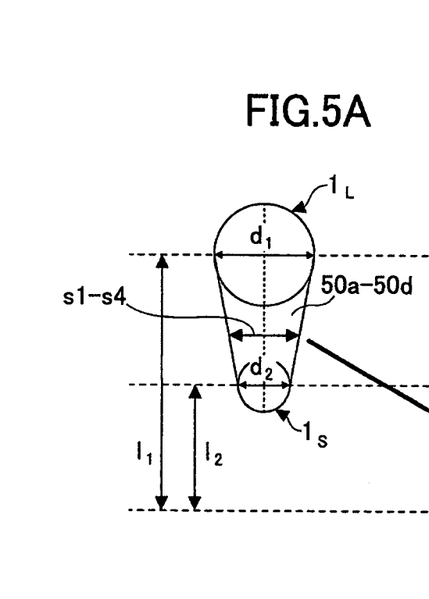
FIG. 5 is a drawing (2) illustrating a method of designing the guide of the capture device for biometrics authentication of FIG. 3.

When assuming that the size of the palm is in proportion to the thickness of the finger(s), as illustrated in FIG. 5, the widths s1 through s4 of the guide grooves 50a, 50b, 50c, and 50d are determined in a manner such that the position of the person's palm $1_L$ or $1_S$ is determined by where the thicknesses "$d_1$" and "$d_2$" of the person's palm $1_L$ and $1_S$ are in proportional to the distances between the person's palm $1_L$ and $1_S$ and the optical center "O" of the image sensor 10. Further, the distances s11 through s13 between the four fingers without the thumb are in proportion to the size of the hand; therefore, the distances between the guide grooves 50a, 50b, 50c, and 50d are determined so as to be increased in proportion to the distance from the image sensor unit 20.

In the above description, a case is described where the guide grooves 50a, 50b, 50c, and 50d are provided corresponding to the respective four fingers without the thumb among the person's fingers. However, depending on a case, the guide grooves may be provided for only two fingers (e.g., the mid finger and the annular finger) from among the four fingers or only one finger (e.g., the mid finger).

Further, in the above description, as illustrated in the side view of FIG. 3C, a case is described where the guide 50 is provided to support only a part of the entire length of the fingers. However, the present invention is not limited to this configuration. For example, the guide may have long depth (in the longitudinal direction of the fingers) so as to support the entire length of the fingers.

When the person's palm $1_L$ and $1_S$ to be authenticated is lowered from the upper side so that the fingers of the person's hand $1_L$ and $1_S$ to be authenticated are inserted in the guide grooves 50a through 50d, the person's hand $1_L$ and $1_S$ to be authenticated may not be lowered any more at the position where the heights of the person's hand $1_L$ and $1_S$ correspond to the sizes of the person's hand $1_L$ and $1_S$, respectively. More specifically, the person's hand $1_L$ and $1_S$ to be authenticated may not be lowered any more at the position where the distances between the optical center "O" of the image sensor 10 of the image sensor unit 20 and the person's hand $1_L$ and $1_S$ correspond to the sizes of the person's hand $1_L$ and $1_S$, respectively, and then, the user stops lowing his/her hand. In this state, by capturing the image of the person's palm $1_L$ and $1_S$ using the image sensor 10 of the image sensor unit 20, the image of the person's palm $1_L$ and $1_S$ to be authenticated may be captured in a manner such that the person's palm $1_L$ and $1_S$ just fit the angle of view "β" (constituting a capturing range "R") of the image sensor 10.

Figure 5B:
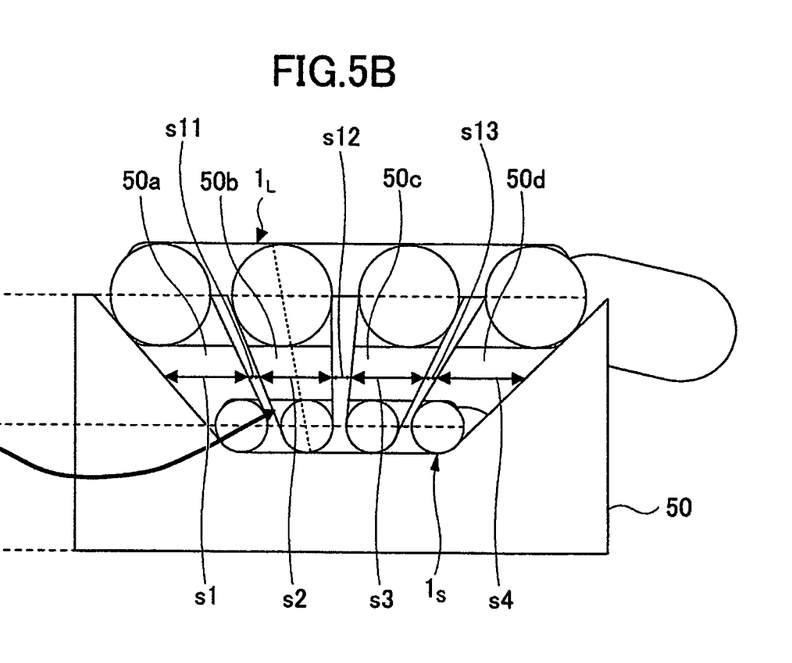

Further, as apparent from FIG. 5B, in a configuration of the guide 50 of the biometrics authentication device according to the third embodiment of the present invention, the position of the hand in a hand lateral direction (i.e., the direction from the thumb to the little finger or the direction from the little finger to the thumb) is automatically determined by where the hand in the hand lateral direction just fits the angle of view "β" of the image sensor 10. Further, as illustrated in the side view of FIG. 3C, by disposing the guide 50 in a manner such that the guide 50 extends along the angle of view "β", the position of the hand in a front-back direction (i.e., the direction from the fingertip to the wrist or the direction from the wrist to the fingertip) is automatically determined by where the hand in the front-back direction just fits the angle of view "β" of the image sensor 10.

On the other hand, due to individual variation, the thickness of the finger is not completely in proportion to the size of the hand (i.e., the size of the palm to be authenticated). Because of this feature, in a case where a set of the user can be limited to some extent, it is preferable that the relationship between the thickness of the finger and the size of the hand (i.e., the size of the palm to be authenticated) within the set is obtained, so that the guide 50 is designed based on the obtained relationship. By doing in this way, the guide 50 in response to the obtained relationship of the users to be authenticated may be designed more accurately. As a result, it may become possible to improve the accuracy of the distance between the image sensor 10 and the palm to be authenticated, that is the positioning accuracy of the position of the palm to be authenticated.

Figure 6A:
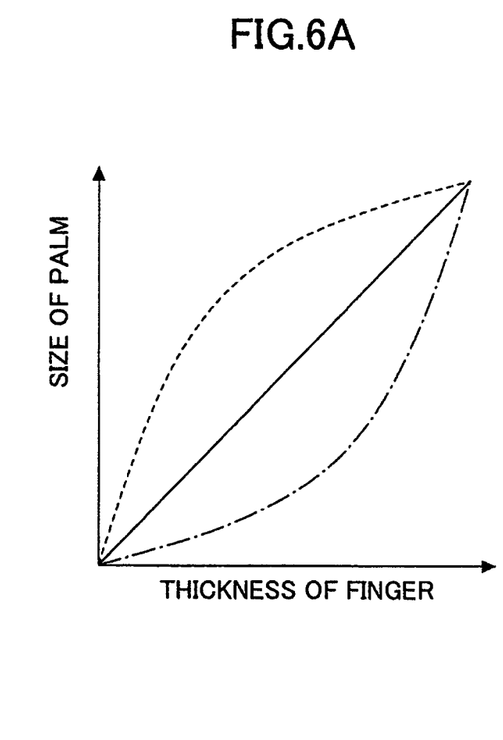
FIG. 6 is a drawing (3) illustrating a method of designing the guide of the capture device for biometrics authentication of FIG. 3.

For example, when the relationship between the thickness of the finger and the size of the hand (i.e., the size of the palm to be authenticated) is not directly proportional as indicated in the solid straight line in the graph of FIG. 6A but is better fitted by a curve indicated by the dashed curve or the dash-dotted curve in the same graph, the shape of the guide grooves 50a through 50d may be determined based on such relationships.

Figure 6B:
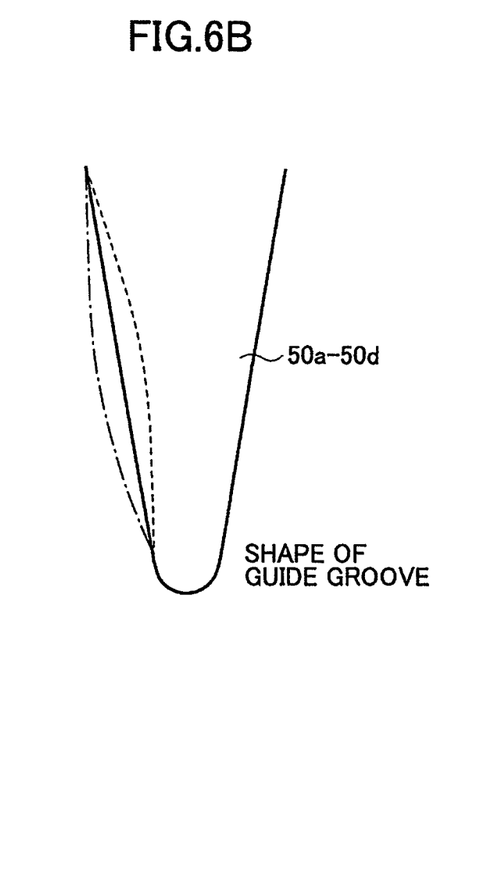

Regarding the relationship indicated by the dashed curve in FIG. 6A, in the region where the fingers are relatively thin (i.e., in the left side of the figure), a rate of the change of the size of the palm is greater than that of the thickness of the fingers; and in the region where the fingers are relatively thick (i.e., in the right side of the figure), the rate of the change of the size of the palm is smaller than that of the thickness of the fingers. In this case, in response to this relationship, as indicated in the dashed curve in FIG. 6B, in the region where the width of the guide groove is relatively narrow (i.e., in the lower side of the figure), the slope of the side wall of the guide groove is set steep in a manner such that even when the thickness of the figures to be inserted into the region slightly differs, the depth in the inserting direction, namely the position in the up-and-down direction, largely changes; on the other hand, in the region where the width of the guide groove is relatively wide (i.e., in the upper side of the figure), the slope of the side wall of the guide groove is set gentle in a manner such that even when the thickness of the figures to be inserted into the region differs, the depth in the inserting direction, namely the position in the up-and-down direction, does not significantly change.

On the contrary, regarding the relationship indicated by the dash-dotted curve in FIG. 6A, in the region where the fingers are relatively thin (i.e., in the left side of the figure), a rate of the change of the size of the palm is smaller than that of the thickness of the fingers; and in the region where the fingers are relatively thick (i.e., in the right side of the figure), the rate of the change of the size of the palm is greater than that of the thickness of the fingers. In this case, in response to this relationship, as indicated in the dash-dotted curve in FIG. 6B, in the region where the width of the guide groove is relatively narrow (i.e., in the lower side of the figure), the slope of the side wall of the guide groove is set gentle in a manner such that even when the thickness of the figures to be inserted into the region differs, the depth in the inserting direction, namely the position in the up-and-down direction, does not significantly change; on the other hand, in the region where the width of the guide groove is relatively wide (i.e., in the upper side of the figure), the slope of the side wall of the guide groove is set steep in a manner such that even when the thickness of the figures to be inserted into the region slight differs, the depth in the inserting direction, namely the position in the up-and-down direction, significantly changes.

As an example of the above case where a set of the user is limited to some extent, there is a case where the exchange and increase and decrease of the users are limited and the users are families, school students, company employees or the like.

Figure 7:
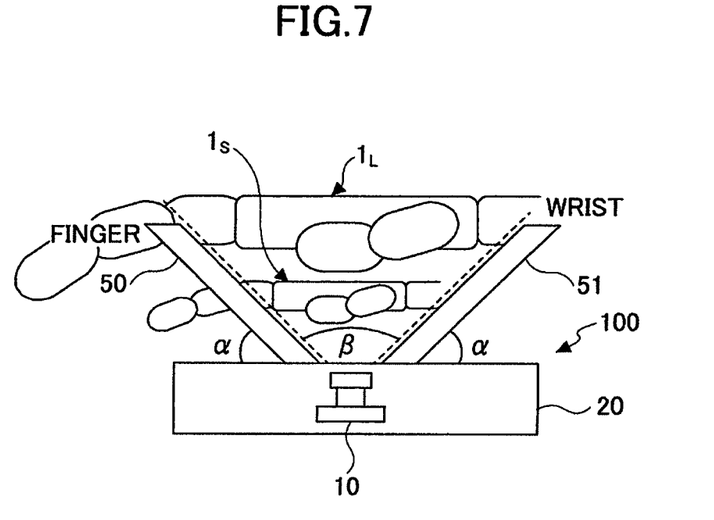
FIG. 7 is a side view illustrating a modified capture device for biometrics authentication based on the capture device of FIG. 3 according to a modified embodiment of the present invention.

Further, in the configuration of the capture device for biometrics authentication according to the first embodiment of the present invention described with reference to FIG. 3 and the like, a guide 51 on the wrist side may further be provided on an as-needed basis as illustrated in FIG. 7. In addition, a mechanism for detecting the contact of the person's body part on the guides 50 and/or 51 may further be added. The mechanism detects a state that the insert of the fingers of the palm to the authentication is not sufficient (i.e., the fingers are still floating) and a state that the fingers are too much inserted. Based on the state detected by the mechanism, capturing the image of the palm to be authenticated by the image sensor 10 may be prevented. Therefore, by using the mechanism, there may be provided a configuration in which the image of the palm to be authenticated is captured only when the palm to be authenticated is placed on the guide 50 in a manner such that the fingers of the palm is properly inserted in the guide grooves 50a through 50d.

Further, the embodiment of the present invention is not limited to the capture device for capturing the hand (i.e., the palm) according to the above first embodiment of the present invention. The capture device of the present invention includes a capture device for capturing the image of any other body part as a person's body part, including a capture device for capturing the image of the finger(s) according to the second embodiment described below with reference to FIG. 8 and a capture device for capturing the image of the wrist according to the third embodiment described below with reference to FIG. 9. Further, the capture device of the present invention includes a capture device for capturing the image of any subject other than person's body parts but has a similar shape even though the size of the subject varies as long as the subject has a relationship like between the size of the person's fingers and the size of the person's palms.

According to the first embodiment of the present invention described above, due to the function of the guide 50 (specifically due to the function of the guide grooves 50a through 50d), the subject to be captured (person's palm $1_L$ and $1_S$ in this embodiment) is automatically guided to the appropriate position having the appropriate distance in accordance with the size of the subject. Because of this feature, it may become possible to easily and securely capture the subject in a manner such that the subject just fits the angle of view "β" of the image sensor (i.e., the camera 10). Further, regarding the image sensor (camera 10), any specific modification may not be added to a prior-art camera. Because of the features, it may become possible to make a capture device compact and inexpensive, the capture device capable of capturing under favorable capturing conditions adapted to the size of the subject to be captured.

FIG. 8 illustrates a configuration of a capture device for biometrics authentication according to the second embodiment of the present invention.

A capture device for biometrics authentication 100A according to the second embodiment of the present invention, in summary, includes guides 50A1 and 50A2 collectively supporting the person's palm $1_L$ or $1_S$ to be authenticated and the image sensor unit 20 having the image sensor (i.e., a camera) 10 for capturing an image of the person's palm $1_L$ or $1_S$ to be authenticated.

Figure 8A:
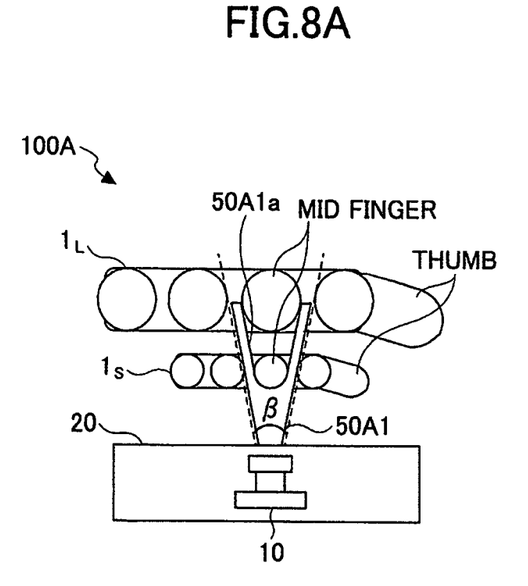
FIG. 8A is a front view illustrating a configuration of a capture device for biometrics authentication according to a second embodiment of the present invention.
Figure 8B:
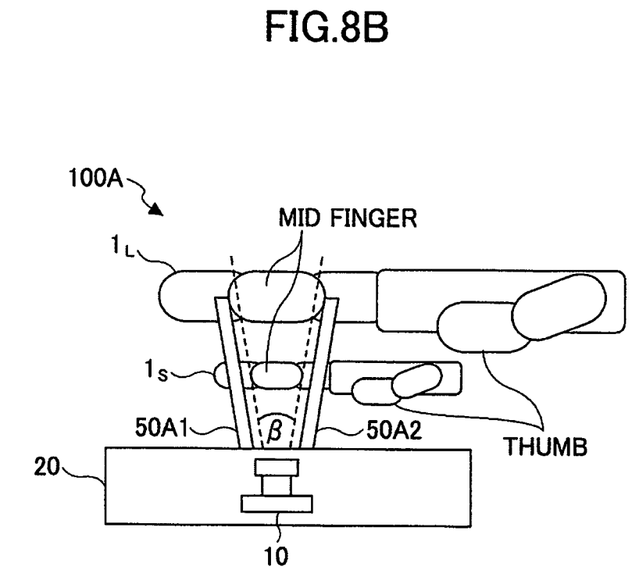
FIG. 8B is a side view illustrating the configuration of the capture device for biometrics authentication according to the second embodiment of the present invention.

As illustrated in FIG. 8, the guide 50A1 has a substantially triangular shape and a guide groove 50A1a in which the person's finger $1_L$ or $1_S$ is inserted. The guide 50A2 has a similar configuration to that of the guide 50A1, and has a guide groove in which the person's finger $1_L$ or $1_S$ is to be inserted. As illustrated in FIG. 8B, those two guides 50A1 and 50A2 are mounted on the image sensor unit 20 in a manner such that those two guides 50A1 and 50A2 supports a part of the person's finger $1_L$ or $1_S$ to be authenticated (in this embodiment, the second joint part of the mid finger) at the both ends of the part in the longitudinal direction.

As illustrated in FIG. 8A, the shape of the guide grooves of those guides 50A1 and 50A2 is formed in a manner such that the widths of the guide grooves are gradually decreased as approaching from the edge portion to the bottom section of the guide grooves (i.e., V-shaped-type).

Herein, in FIG. 8, the person's finger $1_L$ represents the supposed maximum size of a person's finger determined in design process of the guides 50A1 and 50A2. On the other hand, the person's finger $1_S$ represents the supposed minimum size of a person's finger determined in the design process of the guides 50A1 and 50A2.

As described above, the guides 50A1 and 50A2 have the V-shaped-type guide grooves and those guide grooves are designed so that the distance between the image sensor 10 of the image sensor unit 20 and the person's finger $1_L$ or $1_S$ to be authenticated is determined in accordance with the thickness of the person's finger to the authenticated. Further, the guides 50A1 and 50A2 are mounted on the image sensor unit 20 in a manner such that the guides 50A1 and 50A2 extend along boundary lines (i.e., the dashed line in, for example, FIG. 8B of the angle of view "β" of the image sensor 10 of the image sensor unit 20.

In the capture device for biometrics authentication 100A according to the second embodiment of the present invention, similar to the capture device for biometrics authentication 100 according to the first embodiment of the present invention, especially due to the configuration of the (V-shaped-type) guide grooves of the guides 50A1 and 50A2, the subject to be captured (person's finger $1_L$ or $1_S$ in this embodiment) is automatically guided to the appropriate position having the appropriate distance on the guides 50A1 and 50A2 in a manner such that the distance between the person's finger $1_L$ or $1_S$ to be authenticated and the optical center "O" of the image sensor 10 is in proportion to the thickness of the person's finger $1_L$ or $1_S$ to be authenticated (i.e., the size of the person's finger $1_L$ or $1_S$ to be authenticated). Because of this feature, it may become possible to easily and securely capture the person's finger $1_L$ or $1_S$ in a manner such that the person's finger $1_L$ or $1_S$ just fits the capturing range "R" constituted by the angle of view "β" of the image sensor 10. Further, the lack of the necessary information may be prevented and the loss in resolution of the image may be minimized. As a result of using the image data, highly-accurate authentication result is expected to be obtained.

A method of designing the guides 50A1 and 50A2 is described below.

FIG. 9 illustrates a configuration of a capture device for biometrics authentication according to the third embodiment of the present invention.

A capture device for biometrics authentication 100B according to the third embodiment of the present invention, in summary, includes guides 50B1 and 50B2 collectively supporting the person's wrist $1_L$ or $1_S$ to be authenticated and the image sensor unit 20 having the image sensor (i.e., the camera) 10 for capturing an image of the person's wrist $1_L$ or $1_S$ to be authenticated.

Figure 9A:
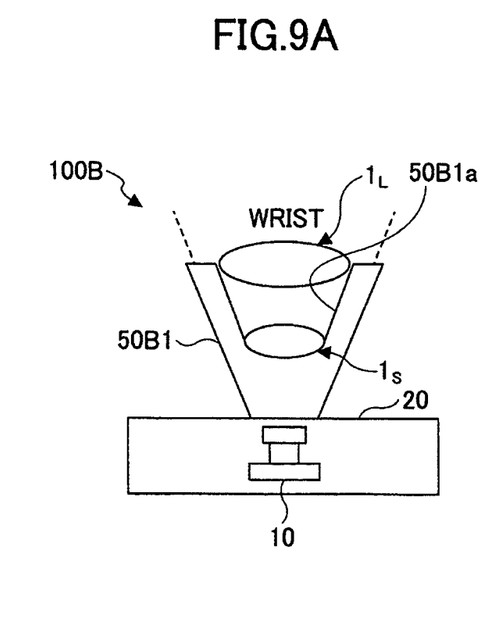
FIG. 9A is a front view illustrating a configuration of a capture device for biometrics authentication according to a third embodiment of the present invention.
Figure 9B:
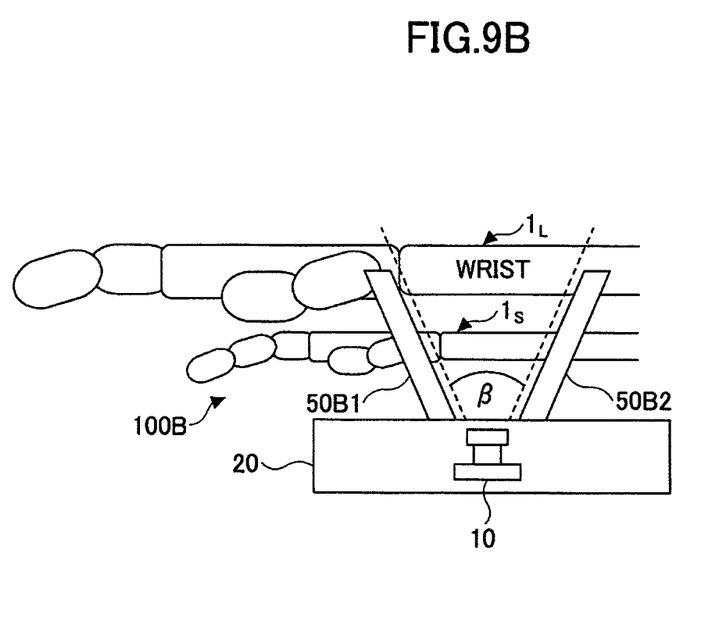
FIG. 9B is a side view illustrating the configuration of the capture device for biometrics authentication according to the third embodiment of the present invention.

As illustrated in FIG. 9, the guide 50B1 has a substantially triangular shape and a guide groove 50B1a in which the person's wrist $1_L$ or $1_S$ is to be inserted. The guide 50B2 has a similar configuration to that of the guide 50B1, and has a guide groove in which the person's wrist $1_L$ or $1_S$ is to be inserted. As illustrated in FIG. 9B, those two guides 50B1 and 50B2 are mounted on the image sensor unit 20 in a manner such that those two guides 50B1 and 50B2 supports the person's wrist $1_L$, or $1_S$ to be authenticated at the both ends of person's wrist $1_L$ or $1_S$ in the longitudinal direction.

As illustrated in FIG. 9A, the shape of the guide grooves of those guides 50B1 and 50B2 is formed in a manner such that the widths of the guide grooves are gradually decreased as approaching from the edge portion to the bottom section of the guide grooves (i.e., V-shaped-type).

Herein, in FIG. 9, the person's wrist $1_L$ represents the supposed maximum size of a person's wrist determined in design process of the guides 50B1 and 50B2. On the other hand, the person's wrist $1_S$ represents the supposed minimum size of a person's wrist determined in the design process of the guides 50B1 and 50B2.

As described above, the guides 50B1 and 50B2 have the V-shaped-type guide grooves and those guide grooves are designed so that the distance between the image sensor 10 of the image sensor unit 20 and the person's wrist $1_L$ or $1_S$ to be authenticated is determined in accordance with the thickness of the person's wrist to the authenticated.

Further, the guides 50B1 and 50B2 are mounted on the image sensor unit 20 in a manner such that the guides 50B1 and 50B2 extend along boundary lines (i.e., the dashed line in, for example, FIG. 9B of the angle of view "β" of the image sensor 10 of the image sensor unit 20.

In the capture device for biometrics authentication 100B according to the third embodiment of the present invention, similar to the capture device for biometrics authentication 100 according to the first embodiment of the present invention, especially due to the configuration of the (V-shaped-type) guide grooves of the guides 50B1 and 50B2, the subject to be captured (person's wrist $1_L$ or $1_S$ in this embodiment) is automatically guided to the appropriate position having the appropriate distance on the guides 50B1 and 50B2 in a manner such that the distance between the person's wrist $1_L$ or $1_S$ to be authenticated and the optical center "O" of the image sensor 10 is in proportion to the thickness of the person's wrist $1_L$ or $1_S$ to be authenticated (i.e., the size of the person's wrist $1_L$ or $1_S$ to be authenticated). Because of this feature, it may become possible to easily and securely capture the person's wrist $1_L$ or $1_S$ in a manner such that the person's wrist $1_L$ or $1_S$ just fits the capturing range "R" constituted by the angle of view "β" of the image sensor 10. Further, the lack of the necessary information may be prevented and the loss in resolution of the image may be minimized. As a result of using the image data, highly-accurate authentication result is expected to be obtained.

A method of designing the guides 50B1 and 50B2 is described below.

Next, specific methods of obtaining the shapes of the guide(s) of the capture devices for biometrics authentication according to the first, the second, and the third embodiments of the present invention are described with reference to FIG. 10.

First, with reference to FIG. 10, a specific method of obtaining the shape of the guide 50 of the capture device for biometrics authentication according to the first embodiment of the present invention is described, the capture device for biometrics authentication according to the first embodiment of the present invention having been described above with reference to FIG. 3 and the like.

(i) First, a model of palm "$1_L$" is prepared that is supposed to be the maximum as the hand (i.e. the palm) to be authenticated. Then, the width "W" just fitting to the hand "$1_L$" is determined (FIG. 10A).

Figure 10A:
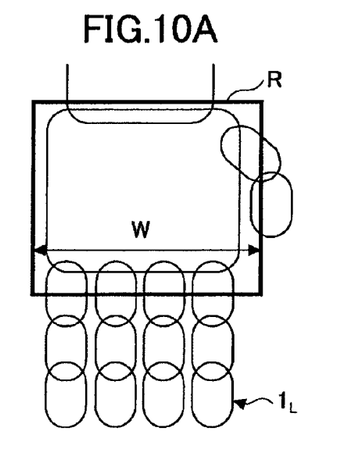
FIG. 10 is drawings illustrating in more detail a method of designing the guide of the capture device for biometrics authentication of FIG. 3.
Figure 10B:
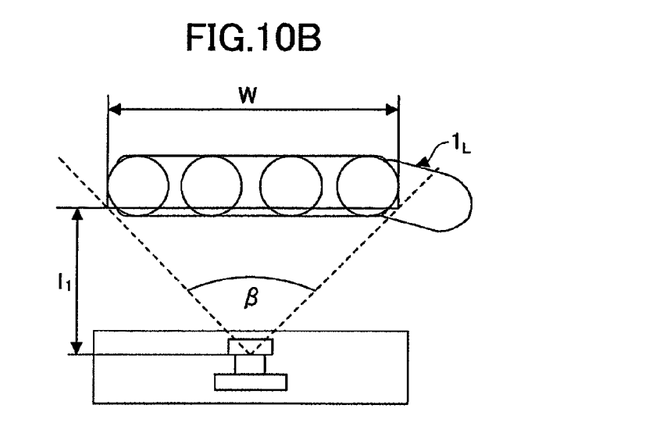

(ii) A height "$1_1$" is determined that is a distance from the optical center "O" of the image sensor 10 and where the above width "W" corresponds to the width of the capturing range "R" constituted by the angle of view "β" of the camera 10 to be used (FIG. 10B).

Figure 10C:
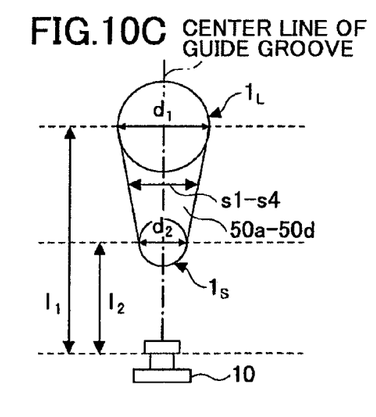

(iii) Based on a proportional relationship between the thickness "$d_1$" of the finger of the model of hand "$1_L$" supposed to be the maximum as the hand (i.e. the palm) to be authenticated and the thickness "$d_2$" of the finger of the model of hand "$1_S$" supposed to be the minimum as the hand (i.e. the palm) to be authenticated, a distance "$1_2$" is obtained that is from the optical center "O" of the image sensor 10 for the above model of palm "$1_S$" supposed to be the minimum as the hand (i.e. the palm). Then the shapes of the guide grooves 50a through 50d are determined in a manner such that the widths s1 through s4 of the guide grooves 50a through 50d are in proportion to the distances at the distances "$1_1$" and "$1_2$" (FIG. 10C).

Figure 10D:
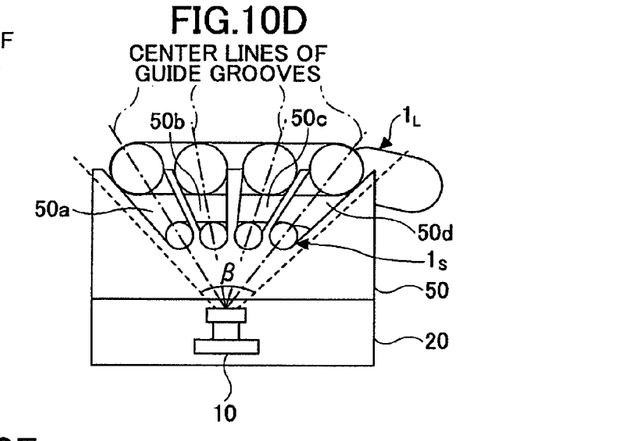

(iv) The center points of the fingers of the model of palm "$1_L$" supposed to be the maximum within the capturing range "R" in FIGS. 10A and 10B are determined. Next, lines between each of the center points and the optical center "O" of the camera 10 are obtained. Then, the shape and the position of the guide 50 is determined so that the guide grooves 50a through 50d are mounted on the image sensor unit 20 in a manner such that the center lines of the guide grooves 50a through 50d (dash-dotted lines in FIGS. 10C and 10D correspond to the lines obtained in this step between respective center points and the optical center "O" of the camera 10 (FIG. 10D).

Figure 10E:
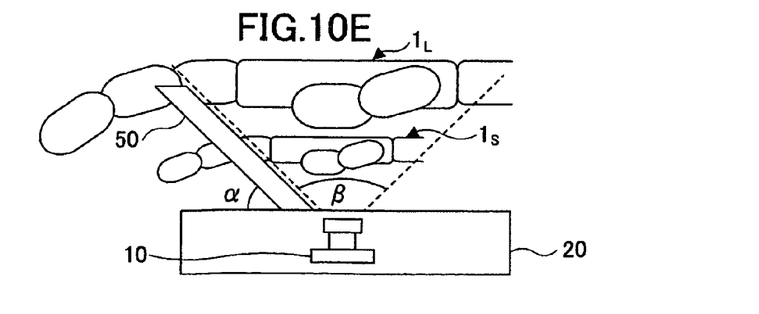

(v) The guide 50 is mounted on the image sensor unit 20 and tilted at an angel of "α" so as to prevent the obtained guide 50 from being within the boundaries of the angle of view "β" of the camera 10 mounted in the image sensor unit 20 (FIG. 10E). Apparent from FIG. 10E, this angle "α" is obtained from the angle of view "β" of the camera 10 using the following formula.

$$\alpha = (180° - \beta)/2$$

the shape of the guides 50A1 and 50A2 of the capture device for biometrics authentication according to the second embodiment of the present invention described with reference to FIG. 8 and the shape of guides 50B1 and 50B2 of the capture device for biometrics authentication according to the third embodiment of the present invention described with reference to FIG. 9 are also obtained in substantially the same method as that described above.

More specifically, a height is obtained that is a distance from the optical center "O" of the image sensor 10 and where the finger (second embodiment) or the wrist (third embodiment) supposed to be the maximum just fits the capturing range "R" of the camera 10. Next, the shape of the guide grooves are determined in a manner such that the thickness of the finger (second embodiment) or the wrist (third embodiment) is in proportion to the distance from the optical center "O" of the image sensor 10 in the case of the finger (second embodiment) or the wrist (third embodiment) supposed to be the maximum and in the case of the finger (second embodiment) or the wrist (third embodiment) supposed to be the minimum. Further, the guides 50A1 and 50A2 or the guides 50B1 and 50B2 are mounted on the image sensor unit 20 and tilted at the angel of "α" so as to prevent the obtained guides 50A1 and 50A2 or the guides 50B1 and 50B2 from being within the boundaries of the angle of view "β" of the camera 10 mounted in the image sensor unit 20 (similar to the case of FIG. 10E).

Figure 11:
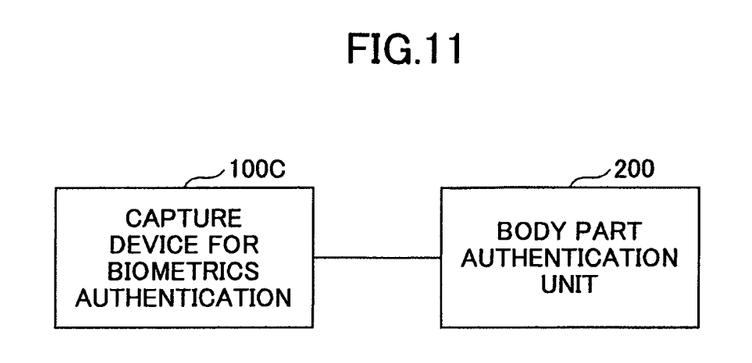
FIG. 11 is a block diagram illustrating a configuration of a biometrics authentication device according to a fourth embodiment of the present invention.

FIG. 11 is a block diagram illustrating a configuration of a biometrics authentication device according to a fourth embodiment of the present invention.

The biometrics authentication device according to the fourth embodiment of the present invention includes a capture device for biometrics authentication 100C and a body part authentication unit 200.

The capture device for biometrics authentication 100C is one of the capture devices for biometrics authentication 100, 100A, and 100B according to the first, the second, and the third embodiments of the present invention. An image of a person's body part to be authenticated is captured by using the camera 10 (e.g., a digital camera) of the capture device for biometrics authentication 100C, and the image data of the person's body part to be authenticated is transmitted to the body part authentication unit 200.

The body part authentication unit 200 extracts the characteristics of the person's body part to be authenticated by performing a predetermined image processing on the image data of the person's body part to be authenticated transmitted from the capture device for biometrics authentication 100C. Then, the body part authentication unit 200 compares the extracted characteristics of the person's body part to be authenticated with previously registered characteristics (references) of the person's body part to be authenticated and determines whether those characteristics are similar to each other within a predetermined error range. When determining that those characteristics are similar to each other within a predetermined error range, the body part authentication unit 200 authenticates that the captured the image of person's body part belongs to the corresponding user. Otherwise, the body part authentication unit 200 determines that the captured the image of person's body part does not belong to any of the users.

A known techniques in the body authentication field or the like may be used in the above predetermined image processing and the method of determining whether the captured person's body part belongs to any of the users. Therefore, detailed descriptions thereof are herein omitted.

All examples and conditional language recited herein are intended for pedagogical purposes to aid the reader in understanding the invention and the concepts contributed by the inventor to furthering the art, and are to be construed as being without limitation to such specifically recited examples and conditions; nor does the organization of such examples in the specification relate to a showing of the superiority and inferiority of the invention. Although the embodiment(s) of the present inventions have been described in detail, it should be understood that various changes, substitutions, and alterations could be made hereto without departing from the sprit and scope of the invention.

What is claimed is:

1. A capture device for biometrics authentication using an image of a person's palm, the capture device comprising:
  an image sensor configured to capture the image of the person's palm; and
  a guide member configured to support the person's palm when the image of the person's palm is captured by the image sensor, wherein
  the guide member includes a groove in which a finger extending from the person's palm is to be inserted, a width of the groove gradually decreases in a direction from an edge to a bottom of the groove, and a slope of a side wall of the groove varies in the direction from the edge to the bottom of the groove, and wherein the groove extends from a surface of the guide member and has the edge at the surface, and the width of the groove gradually decreases in the direction from the edge to the bottom of the groove.

2. The capture device for biometrics authentication according to claim 1, comprising:
  a guide member mounted near the image sensor and configured to support a wrist from which the person's palm extends when the image of the person's palm is captured by the image sensor.

3. The capture device for biometrics authentication according to claim 1, wherein
  the groove of the guide member is configured so that, when the image of the person's palm is captured by the image sensor and while the finger extending from the person's palm is inserted in the groove, a distance between the person's palm and the image sensor is automatically adjusted in accordance with a size of the person's palm.

4. The capture device for biometrics authentication according to claim 3, wherein
  the configuration where the distance between the person's palm and the image sensor is automatically adjusted in accordance with the size of the person's palm is achieved by a configuration that a distance between the person's palm and the image sensor is substantially in proportion to the size of the person's palm.

5. A capture device for biometrics authentication using an image of a person's palm, the capture device comprising:
  an image sensor configured to capture the image of the person's palm; and
  a guide member configured to support the person's palm when the image of the person's palm is captured by the image sensor,
  wherein the guide member includes a groove in which a finger extending from the person's palm is to be inserted, a width of the groove gradually decreases in a direction from an edge to a bottom of the groove, and a slope of a side wall of the groove varies in the direction from the edge to the bottom of the groove,
  wherein the guide member is configured so that, when the image of the person's palm is captured by the image sensor and while the finger extending from the person's palm is inserted in by the guide member, a distance between the person's palm and the image sensor is automatically adjusted by the groove in accordance with a size of the person's palm, and wherein the groove extends from a surface of the guide member and has the edge at the surface, and the width of the groove gradually decreases in the direction from the edge to the bottom of the groove.

6. The capture device for biometrics authentication according to claim 5, wherein
the configuration where the distance between the person's palm and the image sensor is automatically adjusted in accordance with the size of the person's palm is achieved by a configuration that a distance between the person's palm and the image sensor is substantially in proportion to the size of the person's palm.

7. A capture device for biometrics authentication using an image of a person's body part, the capture device comprising:
an image sensor configured to capture the image of the person's body part; and a guide member configured to support the person's body part when the image of the person's body part is captured by the image sensor, wherein the guide member includes a groove in which the person's body part is to be inserted, a width of the groove gradually decreases in a direction from an edge to a bottom of the groove, and a slope of a side wall of the groove varies in the direction from the edge to the bottom of the groove, wherein the guide member is configured so that, when the image of the person's body part is captured by the image sensor and while the person's body part is being supported by the guide member, a distance between the person's body part and the image sensor is automatically adjusted by the groove in accordance with a size of the person's body part, and wherein the groove extends from a surface of the guide member and has the edge at the surface, and the width of the groove gradually decreases in the direction from the edge to the bottom of the groove.

8. The capture device for biometrics authentication according to claim 7, wherein
the configuration where the distance between the person's body part and the image sensor is automatically adjusted in accordance with the size of the person's body part is achieved by a configuration that a distance between the person's body part and the image sensor is substantially in proportion to the size of the person's body part.

9. The capture device for biometrics authentication according to claim 7, wherein
the person's body part is the person's finger.

10. The capture device for biometrics authentication according to claim 7, wherein
the person's body part is the person's wrist.

11. A biometrics authentication device comprising:
a capture device for biometrics authentication according to claim 1.

12. A biometrics authentication device comprising:
a capture device for biometrics authentication according to claim 5.

13. A biometrics authentication device comprising:
a capture device for biometrics authentication according to claim 7.

* * * * *